March 29, 1938.   J. L. SHEA   2,112,714

ELECTRICAL DISTRIBUTION SYSTEM

Filed June 27, 1934

Inventor.
Joseph L. Shea
by Heard Smith & Tennant.
Attys.

Patented Mar. 29, 1938

2,112,714

UNITED STATES PATENT OFFICE 2,112,714

ELECTRICAL DISTRIBUTION SYSTEM

Joseph L. Shea, Nashua, N. H.

Application June 27, 1934, Serial No. 732,667

8 Claims. (Cl. 175—294)

This invention relates to an electrical distribution system of that type which comprises a low voltage (approximately 115–230 volts) secondary network system for serving a city or community and which is supplied from a high voltage primary circuit through suitable transformers. In network systems of this type it is not uncommon to arrange the low voltage secondary system in separate sections, each of which serves a certain portion of a city or district and is fed from the high voltage primary system through a separate transformer.

In some systems of this type the separate sections of the low voltage system are disconnected from each other and each section receives current only through its own transformer. A disadvantage resulting from such an installation is that if there happens to be in the area served by any one section a considerable number of motors which are used either for power purposes or in connection with household appliances, such as electric refrigerators, oil burners, etc., the continual stopping and starting of such motors is very apt to cause an objectionable flickering of the lights in said section.

One of the objects of my invention is to provide a simple and inexpensive construction by which normally the separate sections may be tied together so that in the case of a slight overload at any one section, additional current may be supplied thereto from adjacent sections, but which is so designed that if a short circuit or an excessive overload occurs in any section, said section will be immediately isolated from the other sections thus avoiding any widespread loss of service in the other sections, and is further so designed that when the short circuit or fault has been corrected or the excessive overload has ceased said sections will be automatically connected again.

In accordance with my invention the separate sections are connected by switch devices, each of which is normally closed so that the sections form an interconnected network, said switches being so constructed that when any short circuit occurs in any section of the system the switches connecting said section to the other sections will be automatically opened, thereby isolating the section having the fault therein, and further being so constructed that when the fault has been corrected said switches will be automatically closed thus re-establishing the interconnected condition.

In order to give an understanding of the invention I have illustrated in the drawing diagrammatically one embodiment thereof which will now be described after which the novel features will be pointed out in the appended claims.

Figure 1:
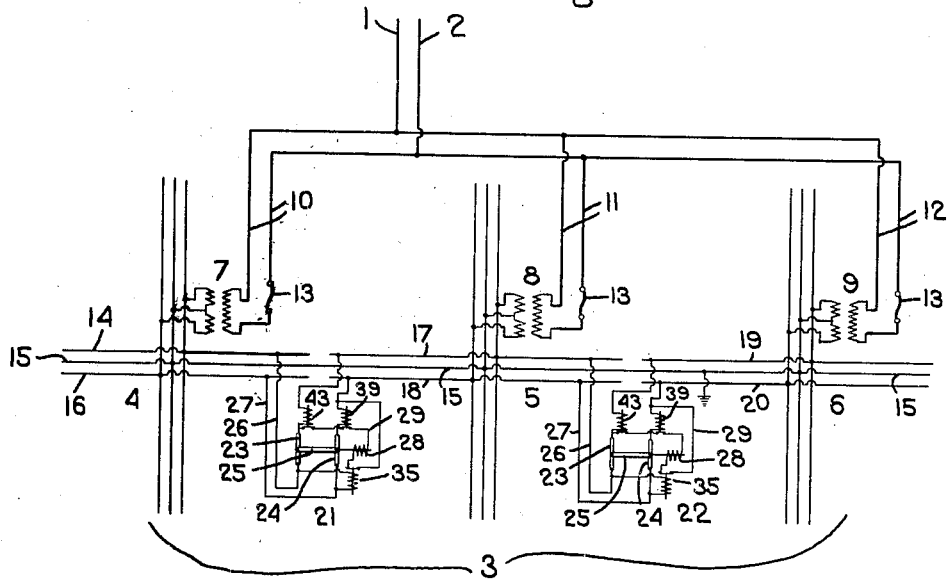
Fig. 1 represents diagrammatically a portion of a distributing system having a secondary low voltage network composed of a plurality of sections.

In the drawing 1, 2 indicate the wires of a high tension primary circuit and 3 indicates a low voltage secondary distributing system which may serve a city or community and which is shown as divided into a plurality of sections indicated at 4, 5 and 6. Each section of the secondary system is fed from the primary circuit 1, 2 through its own transformer, such transformers being indicated at 7, 8 and 9 respectively, the high voltage primary circuit 1, 2 having the feeder lines 10, 11 and 12 leading to the transformers 7, 8 and 9 respectively.

Each transformer has associated therewith the usual fuse device 13 for protective purposes.

The low voltage secondary system is herein illustrated as the usual three-wire system, the wires of the section 4 being indicated at 14, 15 and 16, those of section 5 being indicated at 17, 15 and 18 and those of section 6 being indicated at 19, 15 and 20. In this three-wire system the wire 15 is the neutral or grounded wire.

Figure 2:
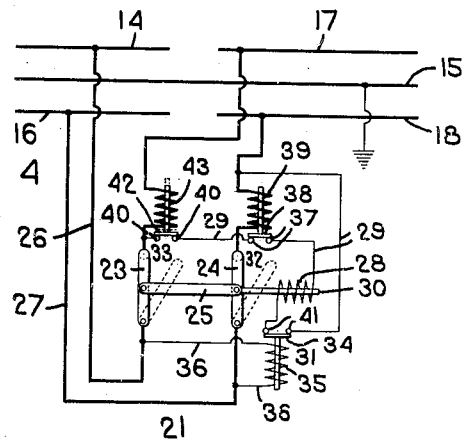
Fig. 2 is a diagrammatic view of the switch device for connecting the secondary network sections.

In accordance with my invention the sections of the secondary are connected in a novel way by section-connecting switch devices, one embodiment of which is illustrated diagrammatically in Fig. 2, and which under normal conditions connect the various sections of the network electrically so that if there is a slight overload in any one section reserve current will be supplied thereto from adjacent sections, but which is constructed to isolate any section if a short circuit or a serious fault occurs therein, and to automatically reconnect the isolated section to the other sections when the fault or short circuit has been corrected.

As herein shown there is one such section-connecting switch, indicated generally at 21, connecting the sections 4 and 5, and another section-connecting switch indicated at 22, connecting the sections 5 and 6. These switches are herein illustrated as being of the magnetic type and each comprises two pivoted switch blades 23, 24 which are connected to operate in unison through an insulated link connection 25. The switch blade 23 is in a circuit connection 26 connecting the wire 14 of section 4 with the corresponding wire 17 of section 5 and the switch blade 24 is in a circuit connection 27 connecting the wire 16 of section 4 with the corresponding wire 18 of section 5.

When the switch blades are in the full line position Fig. 2 these circuit connections will be closed and in this way the section 4 will be connected to the section 5. In the same way the section 5 is normally connected to the section 6 through the similar wire connections of the switch 22.

Each section-connecting switch is constructed so that while it is normally maintained closed yet if a fault or a short circuit occurs in any section all the switches by which said section is connected to adjacent sections will be opened automatically thereby isolating the section having the fault therein.

As stated above the switch-connecting switch herein shown is of the magnetic type and includes the magnetic switch coil 28 which is in a circuit connection 29 connecting the two circuit connections 26, 27 on one side of said switch. Under normal conditions the voltage difference between the wires 14, 16 and 17, 18 of the system and the corresponding voltage difference between the circuit connections 26, 27 causes a current to flow through the circuit connection 29 which energizes the switch coil 28 and the latter acting through its core 30 serves to hold the switch blades 23, 24 closed as shown in the full line position, Fig. 2.

The switches 21 and 22 are of that known type wherein if the magnetic switch coil is deenergized the switch will open automatically either by gravity or otherwise.

The circuit connection 29 of each section-connecting switch has therein three normally-closed supplemental switches indicated at 31, 32, 33. The supplemental switch 31 comprises two spaced contacts 41 forming a gap between them adapted to be bridged by the armature 34 of a potential relay 35. The coils of the relay are connected across the two wire connections 26, 27 on the other side of the section-connecting switch from that at which the circuit connection 29 is located as indicated by the wire connection 36 in Fig. 2. If normal voltage exists between the wires 14, 16 or 17, 18 and, therefore, between the wires 26, 27, the potential relay 35 will be energized by a current flow through the wire connection 36, and said relay is so constructed that when it is energized the armature 34 thereof is forced upwardly thereby closing the circuit connection 29 at the contacts 41.

The supplemental switch 32 comprises the two spaced contacts 37 forming a gap between them and which are normally closed by the armature 38 of an overload relay 39, the coils of which are in the circuit connection 27. The supplemental switch 33 is similar to the switch 32 in that it includes the two contacts 40 forming a gap or space between them and which are normally closed by the armature 42 of an overload relay 43, the coils of which are in the circuit connection 26.

The overload relays 39, and 43 are constructed so that they will not be operatively energized by any current flowing in the connections 26, 27 which may normally occur while normal conditions exist in the secondary system, and hence under normal conditions the armatures 38, 42 will be held by gravity or otherwise in position to close the contacts 37 and 40 of the switches 32, 33. Under normal operating conditions, therefore, the circuit connection 29 is a closed circuit connection thereby maintaining the magnetic switch coil 28 energized.

Under these normal conditions the separate sections 4, 5 and 6 are interconnected so that if at any time there is an abnormal drain on any one section, such as might result from substantially simultaneous starting of several motors, the current will be fed to such section from the other sections thereby obviating any voltage drop in the first-named section and consequent objectionable flicker of the lights. If, however, a fault should occur in the section 5, such for instance as the grounding of wire 17, this will result in a heavy current flowing from the wire 14 to the wire 17 through the wire connection 26 thereby energizing the overload relay 43 and raising the armature as shown in dotted lines Fig. 2. This will open the circuit connection 29 thereby de-energizing the magnetic switch coil 28 with the result that the switch will be automatically opened by the switch blades swinging into the dotted line position Fig. 2. By this action the section 5 is automatically disconnected from the section 4. The same operations will occur at switch 22 for the grounding of the wire 17 will cause a heavy current flow from the wire 19 of section 6 to the wire 17 through the circuit connection 26 of the switch 22 and this will result in opening the switch 22 as above described.

When the switches 21 and 22 have thus been opened by the occurrence of the fault then all the current flowing to the fault will pass through the transformer 8 of the faulty section which will result in blowing the fuse 13 of said transformer, thereby rendering the section 5 dead.

With the arrangement shown in Fig. 1 the circuit connection 29 for the magnetic switch coil 28 of the switch 21 is connected to the circuit connections 26, 27 between the switch and the section 5, and hence as soon as said section 5 is isolated and the fuse 13 is blown the circuit connection 29 will be dead and the magnetic switch 28 will remain de-energized and the switch 21 will remain open.

It will be noted that the circuit connection 36 of the potential relay 35 for the switch 22 is connected to the circuit connections 26, 27 for said switch 22 on the side thereof between said switch and the section 5, and hence when said section 5 is isolated and current is cut off therefrom, the circuit connections 26 and 27 of the switch 22 will be dead and the potential relay 35 of said switch 22 will be inoperative so that its armature will drop and thereby open the circuit 29 for the switch 22. Said circuit 29 will remain open so long as current is cut off from the section 5. After both switches 21 and 22 have been opened by the currents of a fault in section 5, they will remain open and the section 5 will remain isolated until normal conditions have been restored therein as will be presently described.

If the ground or short circuit is in connection with the wire 18 then the switches 21, 22 operate as above described except that the breaking of the circuit connection 29 to de-energize the magnetic switch coil 30 will occur through the operation of the overload relay 39.

If a short circuit should occur between the wires 17 and 18 then both overload relays 39 and 43 will be operative and the circuit connection 29 may be broken at two places thus causing the switches 21, 22 to open and isolate the section. Any other fault in any section which will cause either or both of the relays 39, 43 to be operatively energized will serve to open the switch and thus isolate the section of the secondary system having the fault therein.

With the construction herein shown, therefore, the sections of the low voltage secondary system are normally interconnected so that there is opportunity for feed of current from one section to another as necessary to prevent any objectionable flickering of the lights. If, however, a ground or a short circuit or other serious fault occurs in any section the switches connecting said section with the adjacent sections are automatically opened thereby isolating the section containing the fault.

An important feature of my invention relates to a construction by which when the fault or short circuit or other abnormal condition which resulted in the isolating of any section of the distributing system has been corrected and any transformer fuses which may have been blown have been replaced, the switches will be closed automatically and thereby automatically connect to the other sections of the secondary system the section in which the fault occurred and which was previously isolated from said other sections. This automatic re-establishing of the interconnected condition when the fault has been corrected takes place as follows. Assuming that the fault was in section 5 as above-described, then with respect to switch 22 the re-establishment of normal conditions in the section 5 and the supply of current thereto will energize the potential relay 35 of said switch 22, thereby raising its armature 34 against the contacts 41 and closing the switch 31. This will close the circuit 29 of the magnetic coil 28 for the switch 22, thereby energizing said coil as a result of which the switch 22 will be closed, thus re-connecting the sections 5 and 6. With respect to the switch 21 the circuit 29 therefor will have been closed after the section 5 is isolated because the armatures 38 and 42 will have dropped into engagement with the contacts 37 and 40 as soon as current was cut off from the section 7, while the potential relay 35 for the switch 21 will have continued operative because it was connected to the portions of the circuit connections 26, 27 that are between the switch 21 and the section 4. As soon as normal conditions are again established in section 5 and current is delivered thereto, then current flows in the circuit connection 29 for the switch 21, thereby energizing the switch coil 28 and causing the switch 21 to be closed. This will re-establish the connection between the section 5 and the section 4 and bring the interconnected system back into its normal interconnected condition. This restoring of the interconnected condition is thus automatically accomplished as soon as the fault in the section 5 has been removed and any blown fuse has been replaced. If when a fault occurs as above-described, there is sufficient current flowing to the fault from the sections beyond sections 4 or 6 to open the section-connecting switches by which said sections are connected to the sections 4 and 6, said switches will be immediately closed again so as to continue the service to the sections 4 and 6 because said sections 4 and 6 and the other sections are still being fed by their transformers and the closing of the switches beyond sections 4 and 6 will occur automatically as described above. The only switches which will remain open are those on either side of the section in which the fault occurs which has become dead by the blowing of the fuse in the transformer feeding such section. The establishing of the normal conditions again will also energize the potential relay 35 thereby rendering it operative to close its armature 34 against the contacts 41. This will close the circuit connection 29 and as soon as this connection is closed the magnetic switch coil 28 becomes operative to swing the switch blades 23, 24 into their closed position.

While I have illustrated herein a simple switch construction embodying my invention by which the separate sections are normally interconnected but which operates not only to isolate any section when a fault occurs therein but also to reconnect said isolated section with the other sections automatically when the fault has been corrected, yet I wish to state that the invention is not limited to the constructional details of the switch herein shown as various changes may be made in the switch structure without departing from the invention as expressed in the appended claims.

I claim:

1. An electrical distributing system comprising a high voltage primary circuit, a low voltage distributing system divided into a plurality of sections, parallel-connected feeder circuits connecting the sections to the primary circuit, a transformer in each feeder circuit for supplying the low voltage current thereto from the high voltage circuit whereby each section has its own current supply, a fuse associated with each transformer, a magnetic switch connecting each two adjacent sections, said switch having a switch coil which when energized holds the switch closed, a circuit for the switch coil normally energized by current supplied from either of the two adjacent sections, means rendered operative by current supplied from either of said adjacent sections to hold the circuit for the switch coil closed, and means to de-energize said switch coil when a ground fault occurs in either one of said two adjacent sections whereby the switch will open and the fuse of the transformer supplying the faulty section will fail.

2. An electrical distributing system comprising a high voltage primary circuit, a low voltage distributing system divided into separate sections, parallel-connected transformers, one for each section, for supplying current to said sections from the primary circuit, a fuse for each transformer, a switch connecting each two adjacent sections, a switch coil for holding each switch closed, a circuit for energizing each coil and drawing its coil-energizing current from either of the two sections adjacent thereto, and a supplementary switch in each last-named circuit which is normally held closed by current supplied from either of said adjacent sections.

3. An electrical distributing system comprising a primary high voltage circuit, a low voltage distributing system divided into separate sections, parallel-connected feeder circuits, one for each section, connecting the sections to the high voltage circuit, whereby each section has its individual current supply, a transformer and a fuse in each feeder circuit, a magnetic switch connecting each two adjacent sections, said switch having a switch coil for holding the switch closed, a circuit for said coil energized by current supplied from either of said two adjacent sections, a normally closed supplementary switch in said circuit, means to open the supplementary switch and thus de-energize the switch coil when a fault occurs in one of the two adjacent sections whereby the magnetic switch will open and the fuse of the feeder circuit for the faulty section will fail, a second supplementary switch in the coil circuit normally held closed by current supplied from either of the adjacent sections but capable of being closed by current supplied from one section only when the switch is open, whereby when normal conditions again exist in the faulty section and the blown fuse has been replaced the magnetic switch will be automatically closed thus reconnecting said two adjacent sections.

4. An electrical distributing system comprising a high voltage primary circuit, a low voltage distributing system divided into separate sections, parallel-connected feeder circuits, one for each section, connecting said sections to the primary circuit, a transformer and a fuse for each feeder circuit, a switch connecting each two adjacent sections, means rendered operative by current supplied from both of said adjacent sections to hold the switch closed, and means to render the last-named means inoperative when a ground fault occurs in either section, whereby the switch is opened and the fuse of the transformer supplying the faulty section will fail.

5. An electrical distributing system comprising a high voltage primary circuit, a low voltage distributing system divided into separate sections, parallel-connected feeder circuits connecting said sections to the primary circuit, a transformer and a fuse in each feeder circuit, each fuse opening its feeder circuit when abnormal current flows therethrough, a switch connecting each two adjacent sections of the low voltage distributing system, said switch constituting the sole means for feeding current from one section to the other, means rendered operative by current supplied from both adjacent sections for holding the switch closed, and means to open the switch when a ground fault occurs in either section thereby isolating the faulty section from the adjacent sections.

6. An electrical distributing system comprising a high voltage primary circuit, a low voltage distributing system divided into separate sections, parallel connected feeder circuits connecting said sections to the primary circuit, a separate transformer and a fuse in each feeder circuit, a switch connecting each two adjacent sections of the low voltage distributing system, a switch coil for holding each switch closed, means operative when any switch is closed for energizing the coil therefor by current supplied from either of the sections adjacent thereto, but when the switch is opened for energizing said coil from current supplied from one of said sections only, means also operative when the switch is closed for maintaining said coil energized by current supplied from either of the adjacent sections, and means to de-energize the coil upon the occurrence of a fault in either section whereby the switch will open and the fuse of the transformer supplying the faulty section will fail.

7. An electrical distributing system comprising a high voltage primary circuit, a low voltage distributing system divided into a plurality of sections, parallel feeder circuits, one for each section, connecting the sections to the primary circuit, a transformer and a fuse in each feeder circuit, a magnetic switch connecting each two adjacent sections, a switch coil for holding each switch closed, a circuit for each switch coil connected to receive current from either of the sections adjacent thereto when the switch is closed but from one only of said sections when the switch is opened, a relay for closing said last-named circuit connected to receive current from either of said sections when the switch is closed but from the other of said sections only when the switch is opened, and means to de-energize said switch coil when a fault occurs in one of the two adjacent sections whereby said switch will open and the fuse of the transformer supplying the faulty section will fail, thereby isolating said section from the adjacent sections.

8. An electrical distributing system comprising a high voltage primary circuit, a low voltage distributing system divided into separate sections, parallel-connected feeder circuits connecting said sections to the primary circuit, a separate transformer and a fuse in each feeder circuit, a switch connecting each two adjacent sections of the low voltage distributing system, a switch coil for holding each switch closed, a circuit for the switch coil connected to one of the adjacent sections, a potential relay normally holding the switch coil circuit closed and having its coil connected to the other adjacent section, and means to de-energize the switch coil upon the occurrence of a fault in either section whereby the switch will open and the fuse of the transformer supplying the faulty section will fail.

JOSEPH L. SHEA.